United States Patent
Behjat et al.

(10) Patent No.: US 12,442,839 B2
(45) Date of Patent: Oct. 14, 2025

(54) ROGOWSKI COIL WITH CALIBRATION UNIT

(71) Applicant: Accuenergy (Canada) Inc., Toronto (CA)

(72) Inventors: Vahid Behjat, Toronto (CA); Yufan Wang, Toronto (CA); Ketao Li, Toronto (CA); Liang Wang, Toronto (CA)

(73) Assignee: Accuenergy (Canada) Inc. (CA)

( * ) Notice: Subject to any disclaimer, the term of this patent is extended or adjusted under 35 U.S.C. 154(b) by 193 days.

(21) Appl. No.: 18/359,875

(22) Filed: Jul. 27, 2023

(65) Prior Publication Data

US 2025/0035674 A1 Jan. 30, 2025

(51) Int. Cl.
*G01R 15/18* (2006.01)
*G01R 19/00* (2006.01)
*H01F 38/30* (2006.01)

(52) U.S. Cl.
CPC ....... *G01R 15/181* (2013.01); *G01R 19/0092* (2013.01); *H01F 38/30* (2013.01)

(58) Field of Classification Search
CPC ............................. G01R 19/0092; H01F 38/30
See application file for complete search history.

(56) References Cited

U.S. PATENT DOCUMENTS

| | | | |
|---|---|---|---|
| 6,636,028 B2 | 10/2003 | Lavoie et al. | |
| 8,600,695 B2 | 12/2013 | Cook | |
| 9,146,264 B2 | 9/2015 | Cook | |
| 10,546,074 B2 * | 1/2020 | He | G06F 30/367 |
| 2008/0007249 A1 * | 1/2008 | Wilkerson | G01R 15/181 324/127 |
| 2008/0211484 A1 * | 9/2008 | Howell | G01R 15/181 336/229 |
| 2016/0320434 A1 * | 11/2016 | Pascal | G01R 19/0092 |
| 2017/0003348 A1 * | 1/2017 | Fedigan | G01R 31/346 |
| 2017/0059620 A1 * | 3/2017 | Cook | G01R 15/181 |
| 2022/0003828 A1 | 1/2022 | Klumper et al. | |
| 2022/0082590 A1 * | 3/2022 | Steuer | G01R 15/207 |

OTHER PUBLICATIONS

AcuCT Flex Rogowski Coil Datasheet, https://accucdn.accuenergy.com/wp-content/uploads/acuct-flex-series-rogowski-coil-ct-datasheet.pdf, Accuenergy (Canada) Inc.

* cited by examiner

*Primary Examiner* — Dominic E Hawkins
(74) *Attorney, Agent, or Firm* — Dhiraj Jindal; PATENT YOGI LLC (57) ABSTRACT

The invention provides a current measurement device for a primary conductor. The device utilizes a Rogowski coil to generate an output voltage proportional to the rate of change of the primary current flowing through the conductor. The device also includes a calibration unit, operatively connected to the Rogowski coil. The calibration unit is designed to modify the output voltage using a predefined calibration factor, which is determined based on a physical attribute of the Rogowski coil. The device allows for accurate measurement of the current by considering the unique physical characteristics of the coil used in the measurement process.

4 Claims, 8 Drawing Sheets

ROGOWSKI COIL WITH CALIBRATION UNIT

FIELD OF THE INVENTION

The present disclosure generally relates to a Rogowski coil for current measurement.

BACKGROUND OF THE INVENTION

Rogowski coil, is an instrument used to safely measure alternating current (AC) electrical current traveling through a primary conductor such as a cable or busbar in an electrical panel. Through a step-down process, it can be used for metering or protection purposes. As electrical current flows through the conductor it induces a voltage in the coil in proportion to the variation of the conductor's current.

Figure 1:
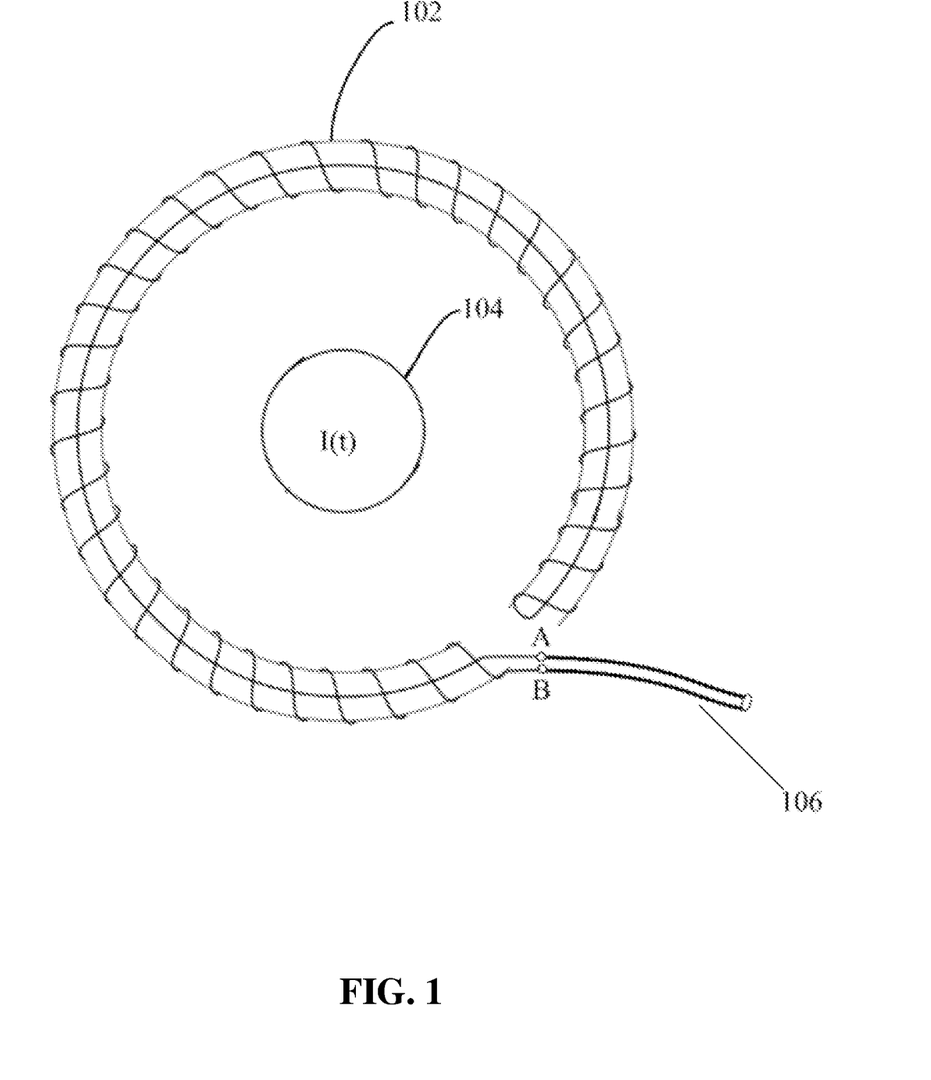
FIG. 1 is a schematic diagram of a conventional Rogowski coil for current measurement.

Referring to FIG. 1, in a Rogowski coil 102 the voltage $V_{AB}(t)$ produced by the Rogowski coil is dependent on various physical attributes of the Rogowski coil. These physical attributes include but are not limited to the area of one of the small loops, the coil turn number, the length of the winding, the major radius of the toroid, and the minor radius.

Specifically, the voltage V_AB (t) can be defined by the equation:

$$V_{AB}(t) = \frac{-AN\mu_0}{l}\frac{dI(t)}{dt}$$

Where $A=\pi r^2$ is the area of one of the small loops, N is coil turn number, $l=2\pi R$ is the length of the winding, $$\frac{dI(t)}{dt}$$

is the rate of the primary current I(t) of the primary conductor 104 threading the loop, $\mu_0$ is the magnetic constant, R is the major radius of the toroid, and r is its minor radius, A and B are the output terminals of the Rogowski coil. The voltage $V_{AB}(t)$, having been stepped down, can be directed to a meter (not shown in FIG. 1) via wire lead 106. The meter connected with wire lead 106 can measure the primary current I(t) according to the voltage $V_{AB}(t)$.

The output of the Rogowski coil is proportional to the derivative of the wire current. The output is often integrated so the output is proportional to the wire's current:

$$V_{OUT}(t) = \int V_{AB} dt = \frac{-AN\mu_0}{l}I(t)$$

During the manufacturing process of Rogowski coils, individual coils are precisely cut from a lengthy coil. The unique feature of the Rogowski coil is that the output voltage of the coil is independent of the coil length. The inconsistency in the output voltage primarily comes from the fact that the coil turn number is not exactly the one that is required to generate the desired output voltage.

Therefore, the improvement in the precision of the Rogowski coil is both desirable and necessary to overcome these inconsistencies.

SUMMARY OF THE INVENTION

The embodiments of the present disclosure generally related to a Rogowski coil for current measurement.

In some embodiments, the present disclosure provides a current measuring device for a primary conductor. The device comprises a Rogowski coil configured to generate an output voltage proportionate to the rate of change of a primary current passing through a conductor and a calibration unit operatively linked with the Rogowski coil. The calibration unit is designed to modify the output voltage based on a predetermined calibration factor; this factor being associated with a physical attribute of the Rogowski coil.

These and other features and aspects of the present disclosure will become fully apparent from the following detailed description of exemplary embodiments, the appended claims and the accompanying drawings.

DETAIL DESCRIPTIONS OF THE INVENTION

Embodiments of the present disclosure will be described herein with reference to the accompanying drawings. In the following descriptions, well-known functions or constructions are not described in detail to avoid obscuring the present disclosure. The word "exemplary" is used herein to mean "serving as an example." Any configuration or design described herein as "exemplary" is not to be construed as preferred, or advantageous, over other configurations or designs. Herein the phrase "coupled" is defined as "directly connected to or indirectly connected with" one or more intermediate components. Such intermediate components may include both hardware and software-based components.

Throughout the drawings and the detailed description, identical reference numbers denote the same, or functionally similar, elements. When the same reference number is used in different figures, it indicates a component that is identical or functionally similar.

It is further noted that, unless otherwise indicated, all functions described herein may be implemented in either software, hardware, or some combination thereof.

It should be recognized that the present disclosure can be performed in numerous ways, including as a process, an apparatus, a system, a method, or a computer-readable medium such as a computer storage medium.

Figure 2:
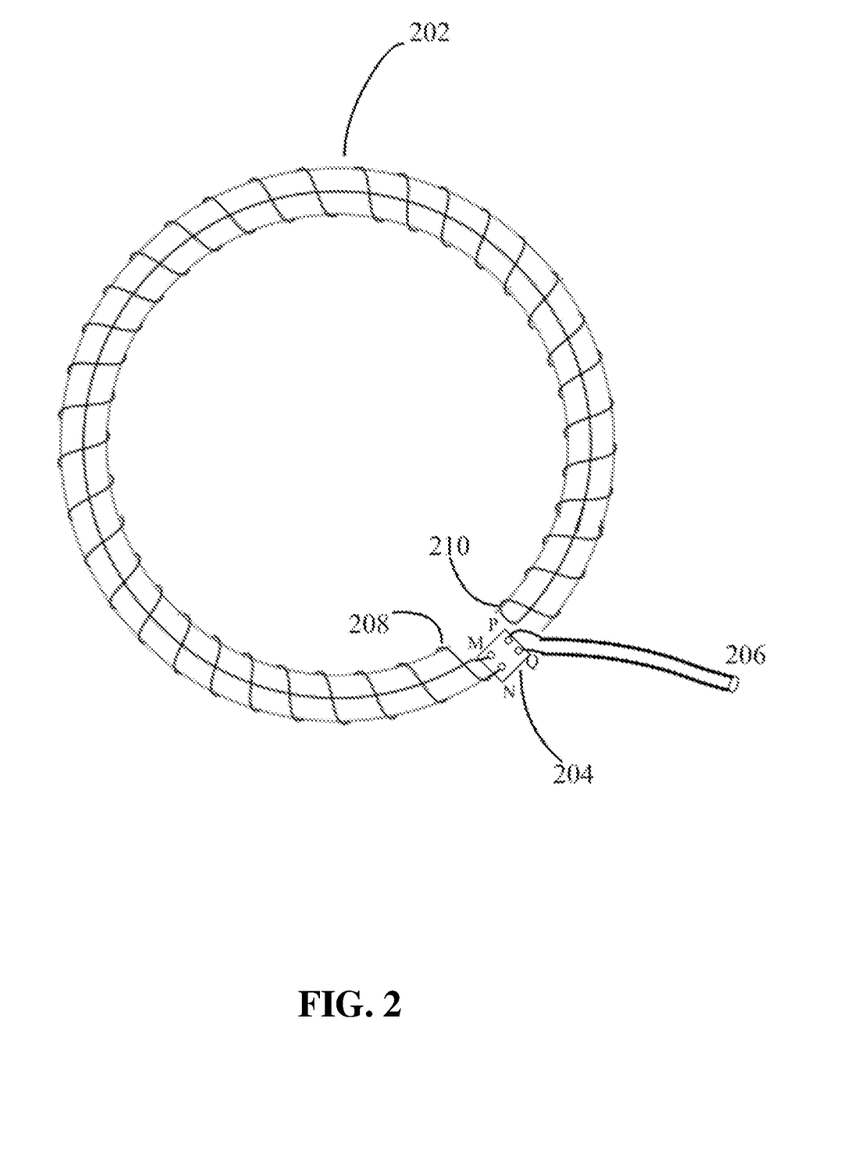
FIG. 2 is a schematic diagram of a Rogowski coil with calibration unit for current measurement according to some embodiments of the invention.

FIG. 2 depicts a schematic diagram showcasing a Rogowski coil 202 linked with a calibration unit 204, designed to measure alternating current in a conductor, according to some embodiments of the invention. Output terminals A (which overlaps with pin M) and B (which overlaps with pin N) of the Rogowski coil 202 establish a connection with the calibration unit 204. The calibration unit 204 may be implemented as a printed circuit board. Illustrated in the diagram, the developed calibration unit comprises two output pins, P and Q. These pins can be interfaced with a current meter (not depicted in FIG. 2) via wire lead 206. Two input pins, M and N, are provided in the calibration unit 204, each linked with output terminals A and B correspondingly. The Rogowski coil 202 features two ends, labeled as 208 and 210.

Figure 3:
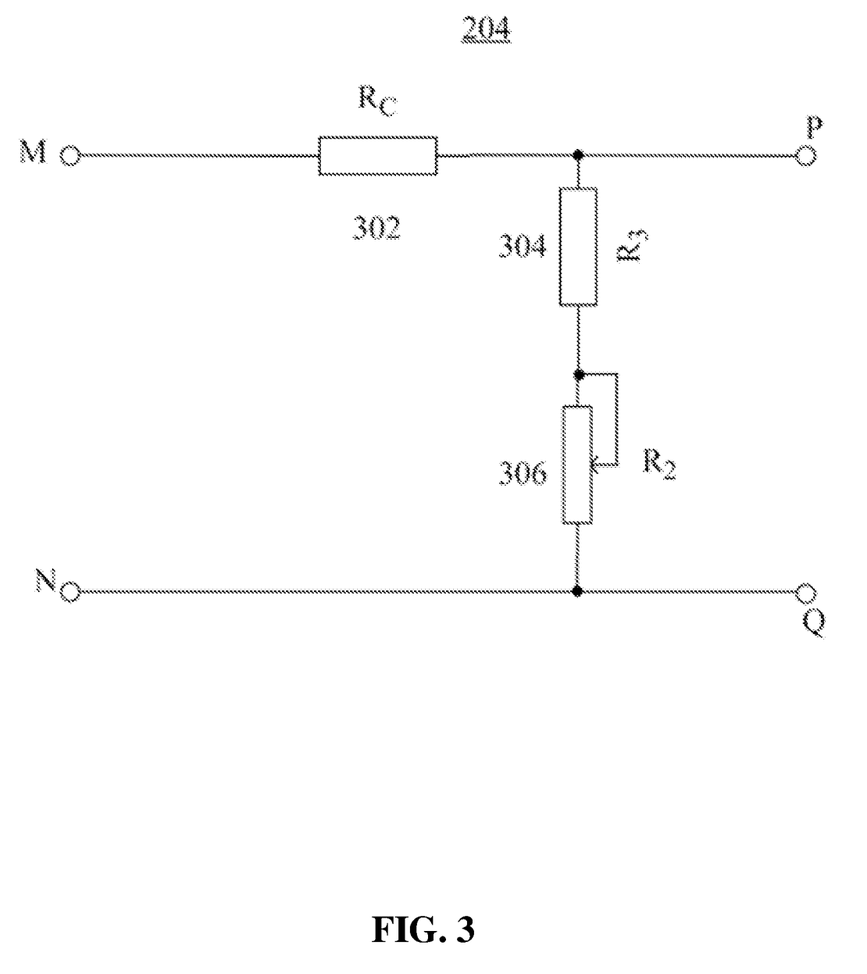
FIG. 3 is a schematic diagram of calibration unit for accurate current measurement according to some embodiments of the invention.

FIG. 3 is a schematic diagram illustrating the calibration unit 204 in accordance with one aspect of the present invention. Calibration unit 204 includes resistors 302 (with a resistance $R_C$) and 304 (with a resistance $R_3$) and a potentiometer 306 (with a variable resistance $R_2$). The output voltage $V_{PQ}$ can be calculated as the following:

$$V_{PQ} = \frac{R_2 + R_3}{R_2 + R_3 + R_c} \times V_{MN}$$

where $V_{PQ}$ is the output voltage between pins P and Q, $V_{MN}$ is the output voltage between pins M and N. Errors stemming from variations in coil turn number can be compensated for by modifying the resistance value of potentiometer 306. The entirety of the calibration unit 204, including all its components, can be mounted on a printed circuit board (PCB) and placed into a custom-designed holder affixed to the unit wall. There exists an access point on the enclosing unit, specifically for adjusting the potentiometer. This adjustment is performed once during calibration, after which it is sealed for the finalized product. It should be recognized that although the calibration unit 204 compensates for the errors caused by variations in coil turns, it is highly sensitive to temperature sine the temperature dependency characteristics of the coil resistance and the copper wire, makes the closed circuit depicted in FIG. 2 dependent to temperature variations.

Figure 4:
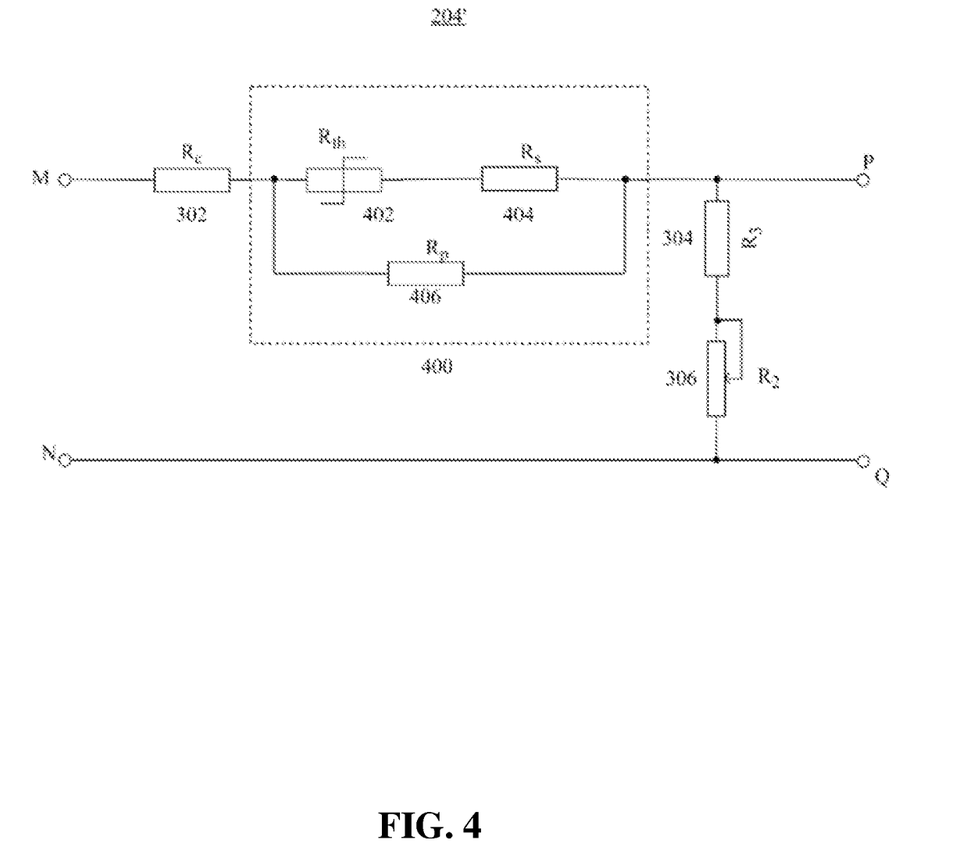
FIG. 4 is a schematic diagram of calibration unit with temperature compensation for accurate current measurement according to some embodiments of the invention.

Considering the high temperature coefficient of the coil copper winding, temperature can significantly impact the characteristics of the calibration unit 204 and coil 202, leading to performance alterations and potential inaccuracies in circuits that require precise measurements. To address this concern, FIG. 4 presents a schematic diagram showing an enhanced calibration unit 204'. This unit not only compensates for variations in coil length but also accounts for the impact of temperature changes within the operational range of coil 202.

In FIG. 4, a temperature compensation module 400 has been integrated into the existing calibration unit 204. The temperature compensation module 400 comprises several components, including a negative temperature coefficient (NTC) thermistor 402, which possesses a variable resistance ($R_{th}$). Additionally, resistors 404 (with resistance $R_s$) and 406 (with resistance $R_p$) are incorporated.

This updated design aims to mitigate the effects of temperature by dynamically adjusting the resistance of the NTC thermistor 402, in combination with the resistors 404 and 406. This adjustment compensates for temperature-induced variations in the output voltage, allowing for more accurate and reliable measurements across the entire temperature operating range of coil 202. The output voltage $V_{PQ}$ can be calculated as the following:

$$V_{PQ} = \frac{R_2 + R_3}{R_2 + R_3 + R_c + R_p \| (R_p + R_{th})} \times V_{MN}$$

The temperature compensation circuit is designed in a way that positive temperature coefficient of the coil copper wire is cancelled out by the negative temperature coefficient of the thermistor branch. Entirety of the calibration unit 204', including all its components, can be mounted on a printed circuit board (PCB) and placed into a custom-designed holder affixed to the unit wall. There exists an access point on the enclosing unit, specifically for adjusting the potentiometer. This adjustment is performed once during calibration, after which it is sealed for the finalized product.

Figure 5:
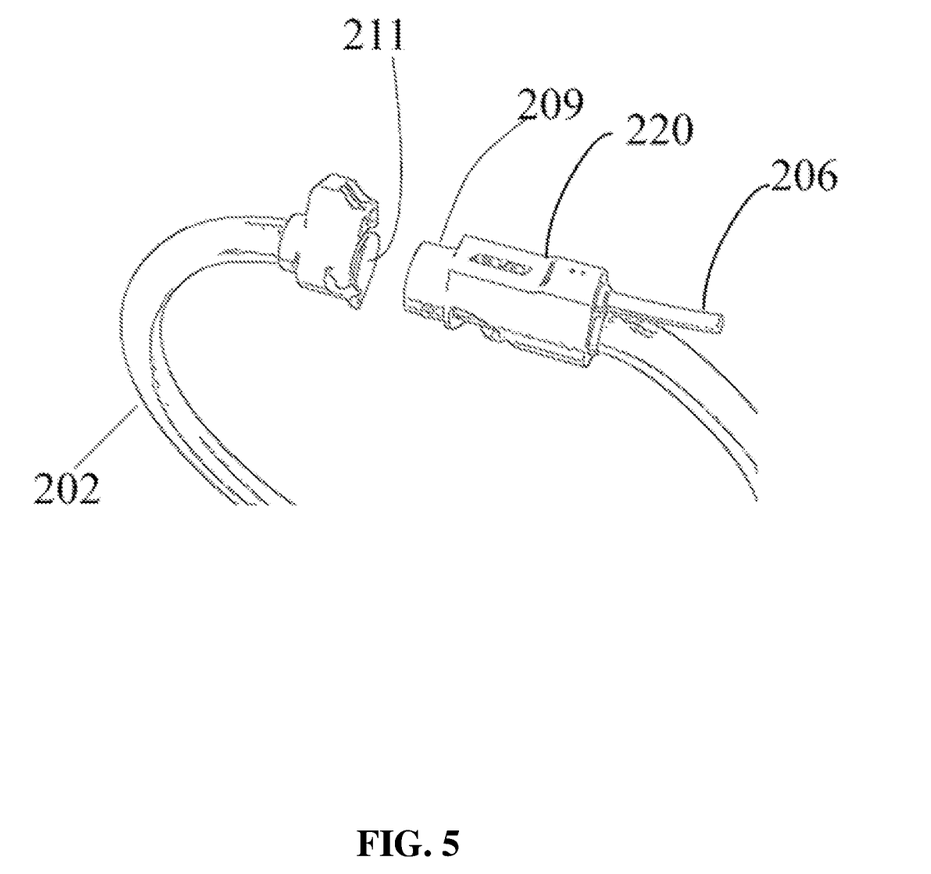
FIG. 5 is a partial perspective view of an open Rogowski coil with calibration unit for current measurement according to some embodiments of the invention.

FIG. 5 presents a depiction of a Rogowski coil 202 in an open state, integrated with a calibration unit 204 intended for current measurement. The coil ends, designated as 208 and 210, are not connected together, with each end enclosed by respective plastic fittings, 209 and 211. In this illustration, calibration unit 204 is firmly situated within a designated holder 220.

Figure 6:
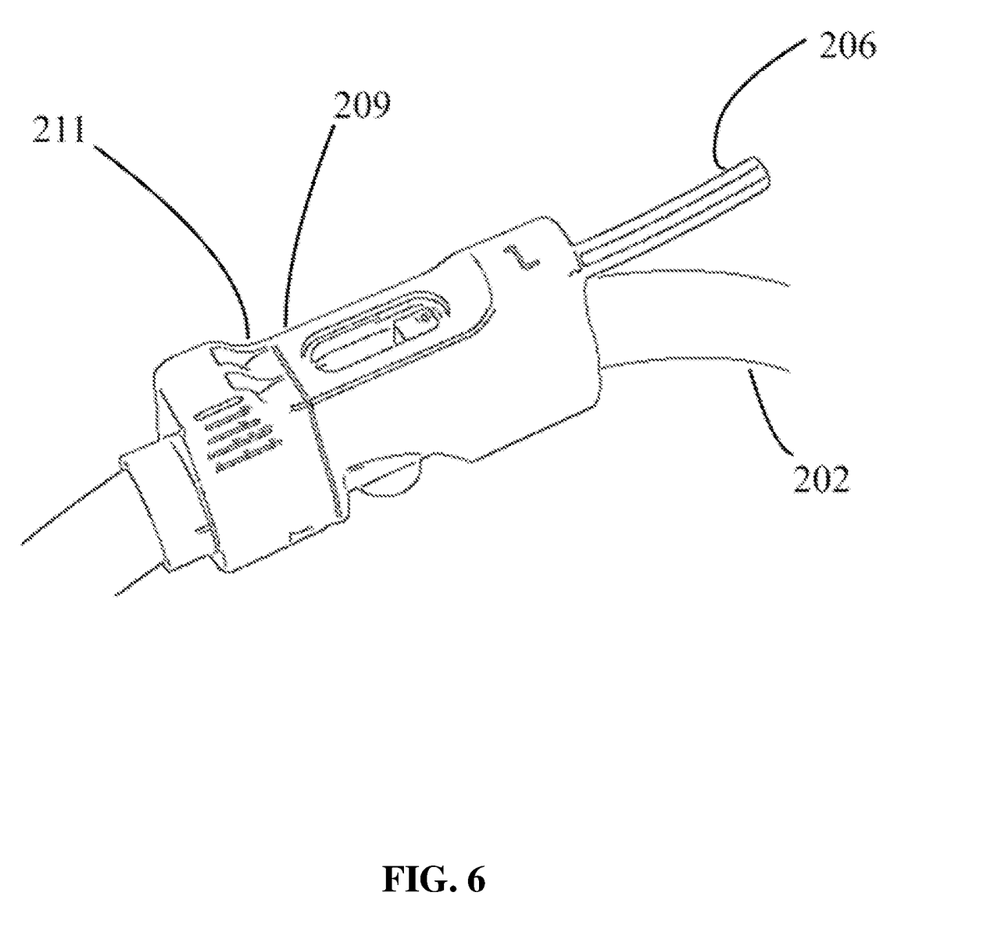
FIG. 6 is a partial perspective view of a closed Rogowski coil with calibration unit for current measurement according to some embodiments of the invention.
Figure 7:
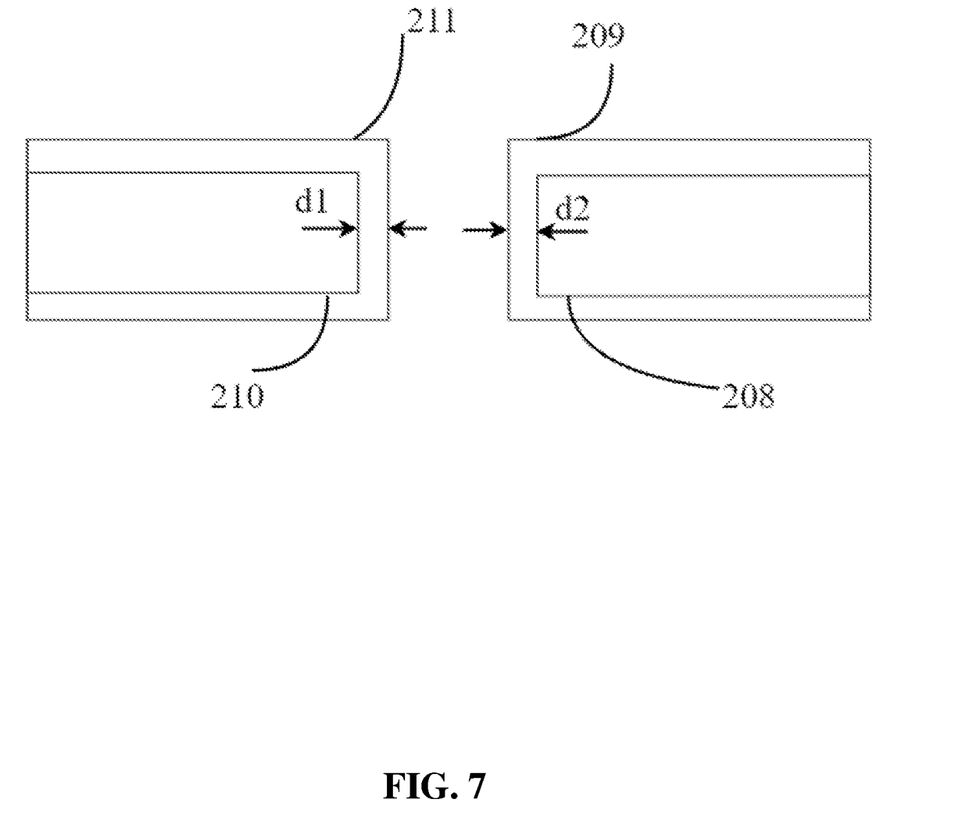
FIG. 7 is a schematic diagram illustrating two ends of a Rogowski coil with calibration unit for current measurement according to some embodiments of the invention.

Contrastingly, FIG. 6 demonstrates the configuration of the Rogowski coil 202 when ends 208 and 210, each enclosed by plastic fittings 209 and 211 respectively, are physically linked together, FIG. 7 is a detailed schematic showcasing the two ends of a Rogowski coil furnished with a calibration unit for current measurement, according to some embodiments of the invention. The end 210 of Rogowski coil 202 is encased by a plastic fitting 211, while end 208 is covered by a plastic fitting 209. Both fittings, 211 and 209, possess an identical thickness (d1 or d2) of 0.75 mm. Upon closing ends 208 and 210 as depicted, fittings 209 and 211 will form an insulating gap of 1.5 mm (d1+d2) between ends 208 and 210. This minimum gap of 1.5 mm between the two ends of the Rogowski coil with calibration unit notably enhances its resistance to external noise, curtails pick-up currents, minimizes crosstalk susceptibility, and decreases positional sensitivity.

Figure 8:
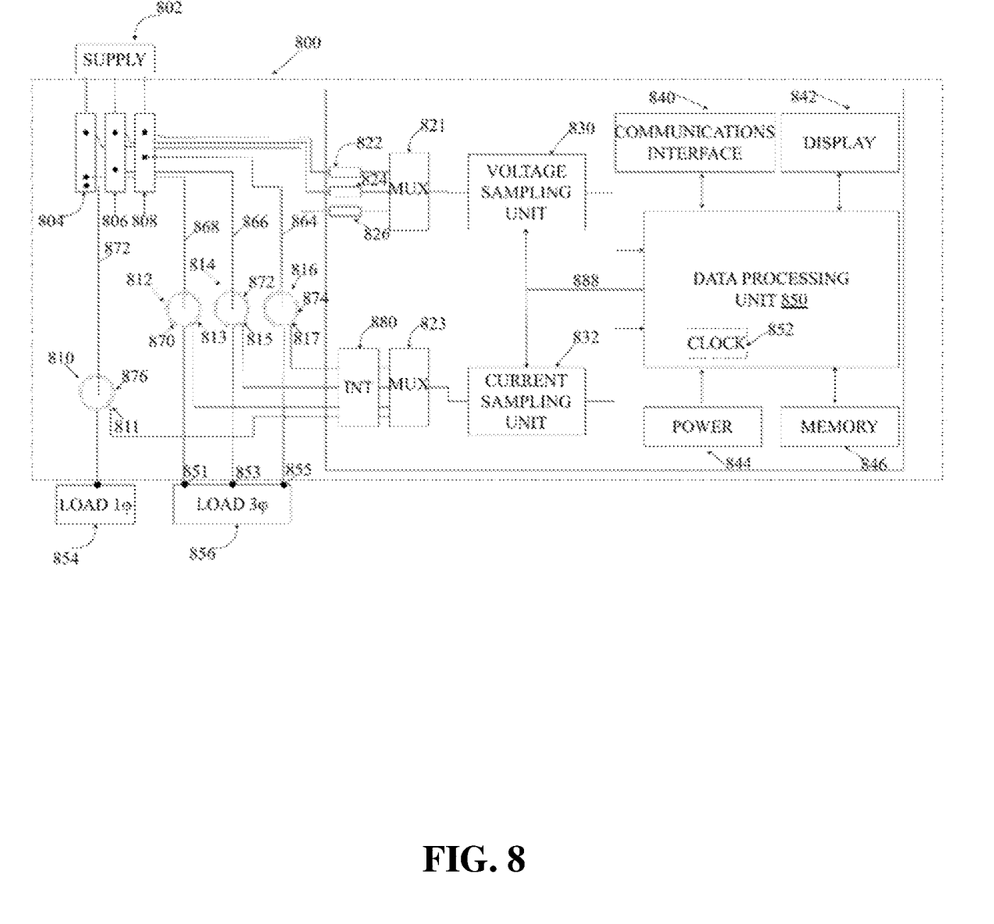
FIG. 8 is a block diagram of a power meter incorporating a Rogowski coil with calibration unit.

Refer to FIG. 8, a digital power meter 800 exemplary model is illustrated. This model essentially includes several voltage transducers 822, 824, 826 and current transducers, notably Rogowski coils 816 and 814. In addition, it comprises voltage and current sampling units 830, 832, and a data processing unit 850. The data processing unit controls the sampling units, reads instantaneous magnitudes of voltage and current, and calculates power and other output parameters based on the magnitude of various measured voltage and current samples.

The sampling units 830, 832 incorporate an analog-to-digital converter (ADC) featuring a sample and hold circuit. This circuit periodically holds the output voltage of one of the voltage or current transducers constant, responding to a signal from the meter's data processing unit. Furthermore, the ADC includes a quantizer that converts the analog output voltage of the transducer into a digital signal. Within the sampling units, time is discretized from its continuous sinusoidal waveform representation of electrical current and voltage. Concurrent magnitudes of voltage or Rogowski coil signals are also converted into discrete, finite precision binary values. Multiplexers 821, 823 sequentially connect the voltage and current transducers to the respective voltage and current sampling units 830, 832. A clock 852, potentially included within the data processing unit 850, provides a time reference that enables the data processing unit to output at least one sampling signal 888, thereby triggering the sampling of voltage and current by respective sampling units 830, 832.

The data processing unit 850 reads the outputs of the sampling units. In a typical digital power meter, the data processing unit comprises at least one microprocessor or digital signal processor (DSP). It reads and stores digital values that quantify the magnitudes of the current and voltage samples and calculates current, voltage, power, and other electrical parameters. These parameters are then output to display 842 for instant viewing or sent to a communications interface 840 for transmission to another data processing system. This could be, for example, a building management computer for remote display or additional processing, such as formulating instructions for automated building equipment. The digital power meter also includes a memory 846 for storing operating instructions, current and voltage samples, transducer specifications, and calculated outputs.

The voltage transducers 822, 824, 826 are voltage divider networks connected to respective conductors for measuring voltage. Each voltage transducer is connected to a specific bus bar 808, 806, 804 carrying a single phase of three-phase power in a power distribution panel. Connecting the voltage transducers to the power distribution panel's bus bars is advantageous because the voltage and phase is consistent for all loads attached to one of the bus bars. However, the voltage transducer(s) can be connected to respective conductors of power anywhere between the panel and the load, such as terminals 851, 853, 855 of the exemplary 3-phase loads 856.

The Rogowski coil with calibration units can include a flexible Rogowski coil and its calibration unit. For instance, Rogowski coil with calibration unit 812 encompasses a flexible Rogowski coil 870 and calibration unit 813, while Rogowski coil with calibration unit 810 includes a flexible Rogowski coil 876 and calibration unit 811.

A conductor for a load current to be measured (or a conductor for a shunt current representative of the load current) is routed through the aperture in the center of a Rogowski coil with calibration unit. As an example, each of the three conductors 864, 866, 868 connecting the exemplary 3-phase load 856 to the supply 802 passes through the core of the Rogowski coil of one of the three Rogowski coils with calibration unit 816, 814, 812. The single conductor 872 connecting the exemplary single-phase load 854 to the supply is routed through the core of the flexible Rogowski coil 810 (neutral conductors are not depicted). The output of the Rogowski coil goes through an integrator circuit 880 to derive the current waveform. Errors resulting from variations in coil turns can be adjusted by the calibration unit. For instance, errors originating from variations in Rogowski coil 810 turns can be adjusted by calibration unit 811, enabling the power meter to measure accurate primary current through conductor 872.

The detailed description above sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The following is claimed:

1. A current measuring device for a primary conductor, the device comprising:
    a Rogowski coil configured to generate an output voltage proportionate to the rate of change of a primary current passing through a conductor, the Rogowski coil having two ends separated by an insulating gap of approximately 1.5 mm when closed, each end encased in a plastic fitting; and
    a calibration unit operatively linked with the Rogowski coil, the calibration unit including a potentiometer and at least one resistor configured to modify the output voltage based on a predetermined calibration factor, the calibration factor being associated with a coil turn number of the Rogowski coil, the calibration unit designed to modify the output voltage based on a predetermined calibration factor, this factor being associated with a physical attribute of the Rogowski coil.

2. The device of claim 1, wherein the calibration unit is mounted on a printed circuit board and includes an access point for adjusting the potentiometer, the potentiometer being sealed after calibration.

3. The device of claim 1, wherein the calibration unit is configured to compensate for errors in the output voltage caused by variations in the coil turn number by adjusting a resistance value of the potentiometer.

4. The device of claim 1, wherein the calibration unit includes a temperature compensation circuit comprising a negative temperature coefficient (NTC) thermistor and at least one resistor, the temperature compensation circuit is configured to adjust the output voltage to maintain consistent measurement precision across a temperature range by compensating for a positive temperature coefficient of a copper winding of the Rogowski coil.

* * * * *